May 5, 1931.  R. C. BERRY  1,803,458
CLUTCH
Filed March 8, 1928
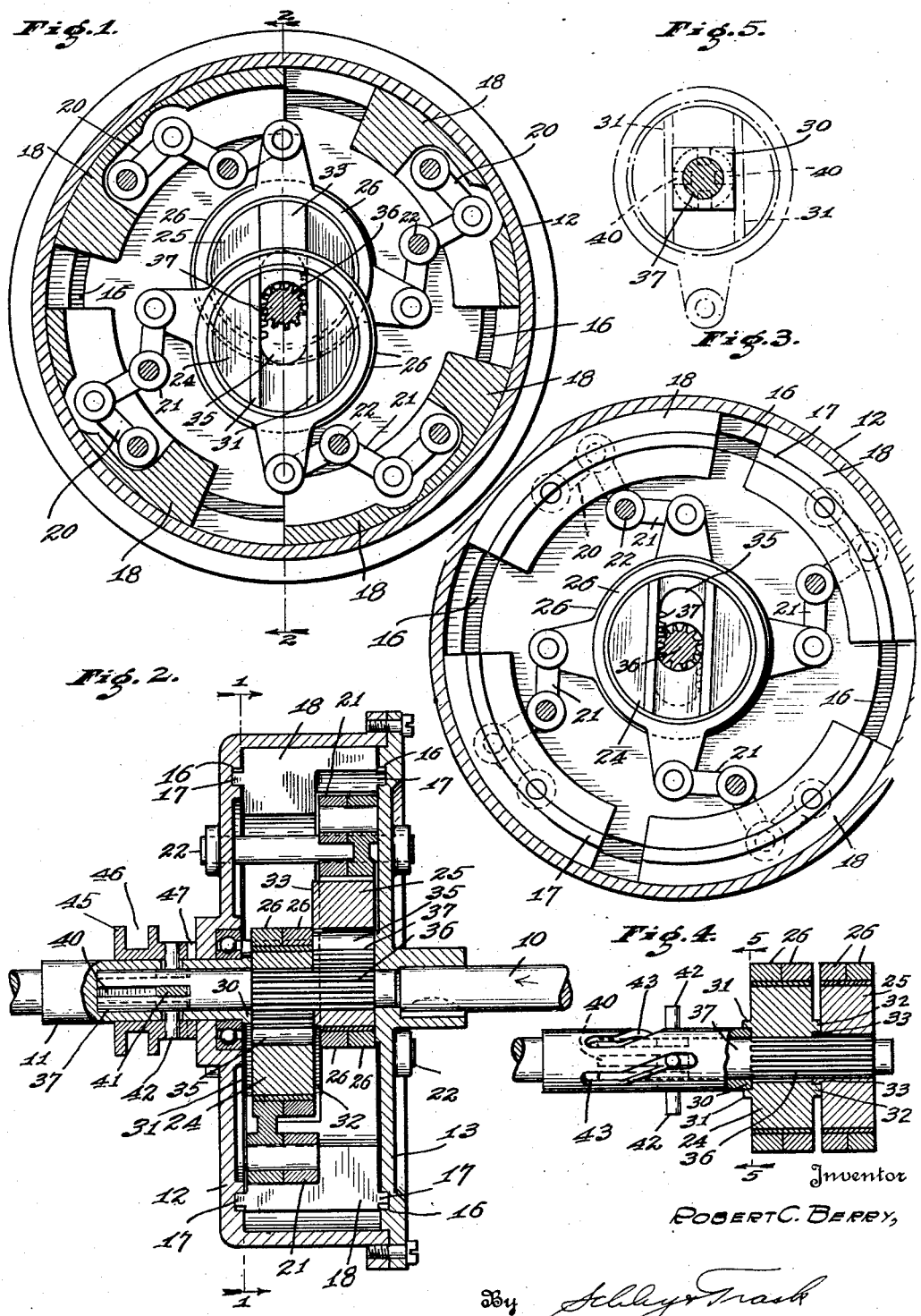
Inventor
ROBERT C. BERRY,
By Schuyler Trask
Attorneys Patented May 5, 1931

1,803,458

UNITED STATES PATENT OFFICE

ROBERT C. BERRY, OF INDIANAPOLIS, INDIANA

CLUTCH

Application filed March 8, 1928. Serial No. 259,974.

It is the object of my invention to produce a clutch mechanism for interconnecting a driving and a driven shaft. More specifically, it is my object to provide such a clutch mechanism in which the torque transmitted from the driving shaft to the driven shaft will vary with the speed of the driving shaft and inversely as the relative speed of the two shafts. A further object is to impose a manual control by which the torque transmitted can be increased to effect a gradual increase in the speed of the driven shaft until it reaches the speed of the driving shaft.

In the preferred embodiment of my invention, I accomplish the above objects by arranging the driving and driven shafts coaxially and by providing one or more eccentrics rotatable with the driven shaft and connected through suitable mechanism to reciprocable weights adapted to reciprocate in contact with a shell or casing secured to the driving shaft. The forces imposed on the eccentric or eccentrics owing to the inertia of the sliding weights and to the friction between them and the casing tends to cause the driven shaft to rotate with the driving shaft; and, since the friction between the reciprocating weights and the casing is dependent upon centrifugal force which in turn is dependent upon the speed of casing rotation, the torque transmitted from the driving shaft to the driven shaft will vary with the speed of the driving shaft. Desirably, I provide means for varying the eccentricity of the eccentrics, as I am thereby able to impose a manual control upon the operation of the clutch mechanism.

The accompanying drawing illustrates my invention: Fig. 1 is a transverse section through the clutch mechanism on the line 1—1 of Fig. 2; Fig. 2 is a longitudinal section on the line 2—2 of Fig. 1; Fig. 3 is a view similar to Fig. 1 but with parts arranged in different positions; Fig. 4 is a horizontal plan view of the mechanism employed in effecting variation in the throw of the eccentrics; and Fig. 5 is a section on line 5—5 of Fig. 4.

As illustrated in the drawing, my clutch mechanism is employed to interconnect a driving shaft 10 and a driven shaft 11. To the end of the driving shaft 10, I rigidly affix a hollow casing desirably consisting of a casing body 12 rotatably mounted upon the end of the driven shaft 11 and secured to a cover plate 13, such cover plate being in turn rigidly attached to the end of the driving shaft 10 as by means of a key. The inner faces of the end walls of the casing formed by the body 12 and cover plate 13 are provided with annular grooves 16 adapted to receive arcuate tongues 17 on circumferentially oscillatable weights 18. The width of the grooves 16 is preferably greater than the thickness of the tongues 17 in order that the exterior face of each of the weights may be free to bear against the inner surface of the circumferential wall of the casing.

In the device illustrated in the drawing, each of the weights 18 is connected through a link 20 with one arm of a bell crank 21, the four bell cranks being pivotally mounted in the casing by means of pivot bolts 22 spaced at equal angular intervals in the casing.

Rotatable with the driven shaft are a pair of eccentrics 24 and 25. Each of these eccentrics has associated with it two eccentric straps 26 which are respectively connected to the inner arms of the bell cranks 21. From this description, it will be evident that relative rotation of the driving and driven shaft 10 and 11 will produce circumferential oscillation of the weights 18 and that the reaction of these weights transmitted to the eccentrics 24 and 25 through the links 20, bell cranks 21, and eccentric straps 26, will tend to cause the driven shaft 11 to rotate with the driving shaft 10.

Desirably I mount the eccentrics in such a manner that their eccentricity may be varied in order that I may impose a manual control upon the tendency of the driving shaft to rotate the driven shaft. To accomplish this purpose I provide on the end of the driven shaft 11 a squared end 30 adapted to be received between spaced tongues 31 on the eccentric 24, this construction permitting radial movement of the eccentric 24 while insuring that it will rotate with the driven shaft 11. The opposite face of the eccentric 24 is provided with a similar pair of spaced driving tongues 32 adapted to co-operate with similar tongues 33 on the eccentric 25 to permit radial movement of that eccentric.

The two eccentrics are provided with diametrical slots 35 in which is received a pinion 36 rigid with a shaft 37 which extends into an axial recess in the end of the driven shaft 11. The eccentric 24 is provided on one side of its diametrical slot with rack teeth 37 adapted to engage the pinion 36, and similar rack teeth are provided on the opposite side of the slot in the eccentric 25. By this construction I am enabled to increase or decrease the throw of the eccentrics 24 and 25 by rotation of the pinion 36 relative to the driven shaft 11.

To effect relative rotation of the pinion 36 and driven shaft 11, I provide in the pinion 36 a plurality of longitudinally extending grooves 40 each of which receives the head 41 of a pin 42. The various pins 42 project outward through slots 43 in the driven shaft 11. The slots 43 are desirably formed with a helical central portion and longitudinally extending end portions, so that as the pins 42 are moved axially of the shaft 11 relative rotation of the shaft 11 and pinion 36 will be produced. Preferably, the slots 43 are so disposed that when the pins 42 are nearest the eccentrics the throw of the eccentrics will be a maximum. The helical portion of the slot 43 is of such an angular extent that movement of the pins 42 to the opposite ends of the slots 43 will bring the eccentrics into concentricity with the two shafts 10 and 11.

To accomplish axial movement of the pins 42, there may be provided on the shaft 11 a slidable collar 45 into radial holes in which the pins 42 project. The collar 45 is provided with an annular groove 46 for the reception of the shifting fork (not shown). If desired, the sliding collar 45 and the adjacent face of the casing body 12 may be provided with a series of co-operating clutch teeth 47 by means of which the driving shaft 10 and the casing may be directly and positively connected to the driven shaft 11.

In operating my clutch mechanism, the collar 45 is adjusted to provide any desired eccentricity of the eccentrics 24 and 25. As the driving shaft 10 and the casing rotate, while the driven shaft 11 remains stationary or rotates at a lower speed, the eccentrics will impart a circumferential oscillation to the weights 18. This oscillation is opposed by the friction between the weights and the inner surface of the casing and also by the inertia of the weights, these two factors co-operating to impose on the eccentrics a reaction tending to cause the eccentrics to rotate with the driven shaft 11. The amount of this reaction will vary with three factors. First, the speed of rotation of the weights and casing will determine the centrifugal force acting on the weights to force them against the inner face of the casing and will thus vary the friction between the weights and the casing. Second, the relative speed of rotation of the driving and driven shafts will determine the rate of oscillation of the weights 18; and as this rate increases, reaction on the eccentrics due to the inertia of the weights will increase. Third, the throw of the eccentrics controls the amplitude of the oscillation of the weights 18; and as this amplitude is increased, the reaction on the eccentrics due to the inertia of the weights 18 will increase. Not only is the amount of the reaction on the eccentrics dependent upon the eccentric throw, but the effectiveness of such reaction is also dependent upon eccentric throw; for the greater the throw of the eccentrics, the greater will be the effective lever arm of the reaction.

To render the clutch mechanism inoperative to transmit torque to the driven shaft 11 from the driving shaft 10, I merely move the sliding collar 45 to the left (Fig. 2) to the limit of its movement. This movement produces rotation of the pinion 36 and draws the eccentrics 24 and 25 toward the center until they are concentric with the shafts 10 and 11. When the eccentrics are in this position, no oscillation of the weights 28 can occur, and the driving shaft 10 is free to rotate relative to the driven shaft 11.

If it is then desired to start the driven shaft, the collar 45 is moved to the right, desirably through only a small distance. This produces a small eccentricity of the eccentrics and a reciprocation of the weights, with the result that a torque is transmitted to the driven shaft. As the driven shaft gains speed, the eccentric throw may be increased gradually, thus increasing the torque transmitted to the driven shaft. When the driven shaft and driving shaft reach the same speed, there is no relative rotation of the eccentrics and the hollow casing, and the weights therefore cease to reciprocate. In this condition the drive to the driven shaft is through the clutch teeth 47.

I claim as my invention:—

1. In combination, two relatively rotatable co-axial members, one or more eccentrics rotatable with one of said members, a plurality of weights carried by the other of said members, guiding means in which said weight are circumferentially oscillatable, and means operatively interconnecting said weights and eccentrics to cause oscillation of said weights as said two members rotate relatively to each other.

2. The combination set forth in claim 1 with the addition of means to vary the throw of said eccentrics.

3. In combination, a rotatable driving member, a rotatable driven member co-axial therewith, one or more eccentrics rotatable with said driven member, a plurality of weights carried by said driving member, guiding means in which said weights are circumferentially oscillatable, and means operatively interconnecting said weights and eccentrics to cause oscillation of said weights as said two members rotate relatively to each other.

4. The combination set forth in claim 3 with the addition of means to vary the throw of said eccentrics.

5. In combination, two relatively rotatable members, one or more weights carried by one of said members, guiding means with which said weights have frictional engagement, means operable upon relative rotation of said members for causing reciprocation of said weights in said guiding means, and means for varying the distance through which said weights reciprocate.

6. In combination, driving and driven rotatable members, an inertia weight reciprocable in a plane substantially perpendicular to the axis of rotation of one of said rotatable members, means operated by relative rotation of said members for causing reciprocation of said weight, and means for varying the distance through which said weight reciprocates.

7. In combination, two relatively rotatable members, one or more weights carried by one of said members, guiding means with which said weights have frictional engagement, means operable upon relative rotation of said members for causing reciprocation of said weights in said guiding means, means for varying up to a predetermined maximum the distance through which said weights reciprocate, and clutch means operative after such maximum distance has been reached for positively clutching said two rotatable members together.

8. In combination, driving and driven rotatable members, an inertia weight reciprocable in a plane substantially perpendicular to the axis of rotation of one of said rotatable members, means including an eccentric rotatable with said driven member and operated by relative rotation of said members for causing reciprocation of said weight, and means for varying the distance through which said weight reciprocates.

9. In combination, driving and driven rotatable members, an inertia weight reciprocable in a plane substantially perpendicular to the axis of rotation of one of said rotatable members, means including an eccentric rotatable with said driven member and operated by relative rotation of said members for causing reciprocation of said weight.

In witness whereof, I have hereunto set my hand at Indianapolis, Indiana, this 6th day of March, A. D. one thousand nine hundred and twenty-eight.

ROBERT C. BERRY.